United States Patent
Ebrahimi Afrouzi et al.

(10) Patent No.: US 10,214,050 B1
(45) Date of Patent: Feb. 26, 2019

(54) ROBOTIC FLOOR CLEANING DEVICE WITH EXPANDABLE WHEELS

(71) Applicants: Ali Ebrahimi Afrouzi, San Jose, CA (US); Shahin Fathi Djalali, San Francisco, CA (US)

(72) Inventors: Ali Ebrahimi Afrouzi, San Jose, CA (US); Shahin Fathi Djalali, San Francisco, CA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 15/447,623

(22) Filed: Mar. 2, 2017

Related U.S. Application Data

(60) Provisional application No. 62/320,942, filed on Mar. 3, 2016.

(51) Int. Cl.
*B60B 19/04* (2006.01)
*B60B 1/06* (2006.01)
*A47L 11/40* (2006.01)

(52) U.S. Cl.
CPC .......... *B60B 19/04* (2013.01); *A47L 11/4011* (2013.01); *A47L 11/4066* (2013.01); *A47L 11/4072* (2013.01); *B60B 1/06* (2013.01); *A47L 2201/04* (2013.01)

(58) Field of Classification Search
CPC .... B60B 1/06; B60B 1/12; B60B 1/14; B60B 19/04; B60B 19/003; B60B 19/12; B60B 19/125; A47L 11/4072; A47L 2201/04
USPC ...................................... 301/5.305, 12.2, 45
See application file for complete search history.

(56) References Cited

U.S. PATENT DOCUMENTS

| | | | | |
|---|---|---|---|---|
| 1,371,980 A | * | 3/1921 | Ramsey | B60C 7/18 152/291 |
| 1,408,885 A | * | 3/1922 | Humphrey | B60B 15/06 301/46 |
| 1,435,042 A | * | 11/1922 | Zottoli | B60C 7/18 152/289 |
| 1,469,393 A | * | 10/1923 | O'Connor | B60B 9/06 152/14 |
| 1,890,872 A | * | 12/1932 | Van Kleeck | B60C 27/045 301/40.2 |
| 2,610,898 A | * | 9/1952 | Smith | B60C 27/045 301/47 |
| 2,916,331 A | * | 12/1959 | Gardner | B60B 19/04 305/19 |
| 2,924,486 A | * | 2/1960 | Blaschke | B60B 15/26 301/48 |
| 3,672,458 A | * | 6/1972 | Mackerle | B60K 7/0023 180/302 |
| 3,995,909 A | * | 12/1976 | van der Lely | B60B 15/26 180/15 |
| 4,420,192 A | * | 12/1983 | Holchuk | B60B 9/28 152/290 |

(Continued)

*Primary Examiner* — Joseph M Rocca
*Assistant Examiner* — Maurice L Williams

(57) ABSTRACT

A mobile robotic floor-cleaning device with wheels that may be expanded or contracted to suit various needs by rotating an inner shaft within the main housing of each wheel relative to the main housing. A series of rollers form the circumference of the wheels, and are connected to the inner shaft via a set of spokes. Rotation of the inner shaft relative to the main housing causes the spokes to pull the rollers in or push them out, changing the diameter and circumference of the wheel.

12 Claims, 5 Drawing Sheets

(56) References Cited

U.S. PATENT DOCUMENTS

| | | | | |
|---|---|---|---|---|
| 4,601,519 A * | 7/1986 | D'Andrade | B60B 15/12 | 301/41.1 |
| 4,643,696 A * | 2/1987 | Law | A63H 17/262 | 301/45 |
| 4,648,853 A * | 3/1987 | Siegfried | A63H 17/262 | 180/7.1 |
| 4,773,889 A * | 9/1988 | Rosenwinkel | A63H 17/262 | 152/454 |
| 5,487,692 A * | 1/1996 | Mowrer | A63H 17/262 | 440/92 |
| 5,492,390 A * | 2/1996 | Kugelmann, Sr. | B60B 19/00 | 301/5.1 |
| 5,690,375 A * | 11/1997 | Schneider | B60B 9/24 | 295/33 |
| 5,894,621 A * | 4/1999 | Kubo | A47L 11/4061 | 15/319 |
| 6,860,346 B2 * | 3/2005 | Burt | B60B 15/00 | 180/218 |
| 7,503,567 B2 * | 3/2009 | Frankie | A61G 5/04 | 180/8.2 |
| 7,594,527 B2 * | 9/2009 | Thompson | B60B 19/04 | 152/175 |
| 8,007,341 B2 * | 8/2011 | Su | A63H 17/36 | 446/431 |
| 8,814,626 B2 * | 8/2014 | Smith | A63H 1/30 | 446/249 |
| 9,073,587 B2 * | 7/2015 | Kim | B60B 19/02 | |
| 9,757,978 B1 * | 9/2017 | Emigh | B60B 19/04 | |
| 9,878,576 B2 * | 1/2018 | Hein | B60B 19/04 | |
| 2010/0141018 A1 * | 6/2010 | McCue | B60B 11/02 | 301/5.1 |
| 2013/0167991 A1 * | 7/2013 | Donohue | B60B 9/26 | 152/5 |
| 2014/0117637 A1 * | 5/2014 | Solheim | B60B 25/00 | 280/63 |
| 2017/0349003 A1 * | 12/2017 | Joso | B60B 9/28 | |
| 2018/0022148 A1 * | 1/2018 | Lin | B60B 1/06 | |

* cited by examiner

ROBOTIC FLOOR CLEANING DEVICE WITH EXPANDABLE WHEELS

CROSS-REFERENCE TO RELATED APPLICATIONS

This application claims the benefit of provisional patent application Ser. No. 62/302,942 filed Mar. 3, 2016 by the present inventor.

FIELD OF INVENTION

The present invention relates to robotic floor cleaning devices, and, more particularly, the wheels of robotic floor cleaning devices.

BACKGROUND

Robotic floor cleaning devices are being used with increasing frequency to maintain clean floors in residential and commercial settings.

One problem in designing robotic floor cleaning devices is selecting a wheel size for the device. Larger wheels may aid a device in driving over obstacles and may allow the device more autonomy and mobility. However, smaller wheels may be better for navigating through environments with lots of obstacles near each other. Additionally, larger wheels may cause the chassis of a robotic floor cleaning device to further from the work surface, which may affect the cleaning efficacy of the device. A need exists for a robotic floor cleaning device that can expand wheels for driving over obstacles when necessary, and contract them when the larger wheel size is not needed.

SUMMARY

It is a goal of the present invention to provide a robotic floor cleaning device that can easily drive over large obstacles and navigate through tight spaces.

The aforementioned goals are achieved through a robotic floor cleaning device with expandable wheels. The wheels are comprised of rollers mounted on the ends of spokes that are turned via an inner shaft within the main housing of the wheel. When the inner shaft is turned relative to the main housing, the spokes (and therefore the rollers) are pushed radially inward or outward. The circumference of the wheels can thus be adjusted at any time, and a single floor cleaning device can benefit from wheels of adjustable circumference.

DETAILED DESCRIPTION OF THE INVENTION

The present invention proposes a robotic floor cleaning device with expandable wheels. The robotic floor cleaning device comprises a shell, a chassis, a set of expandable wheels; at least one motor connected to the wheels for moving the robotic floor cleaning device on a surface; a control unit to control movement of the device, and a means for cleaning a work surface.

Any number of wheels may comprise the set of expandable wheels.

Figure 1:
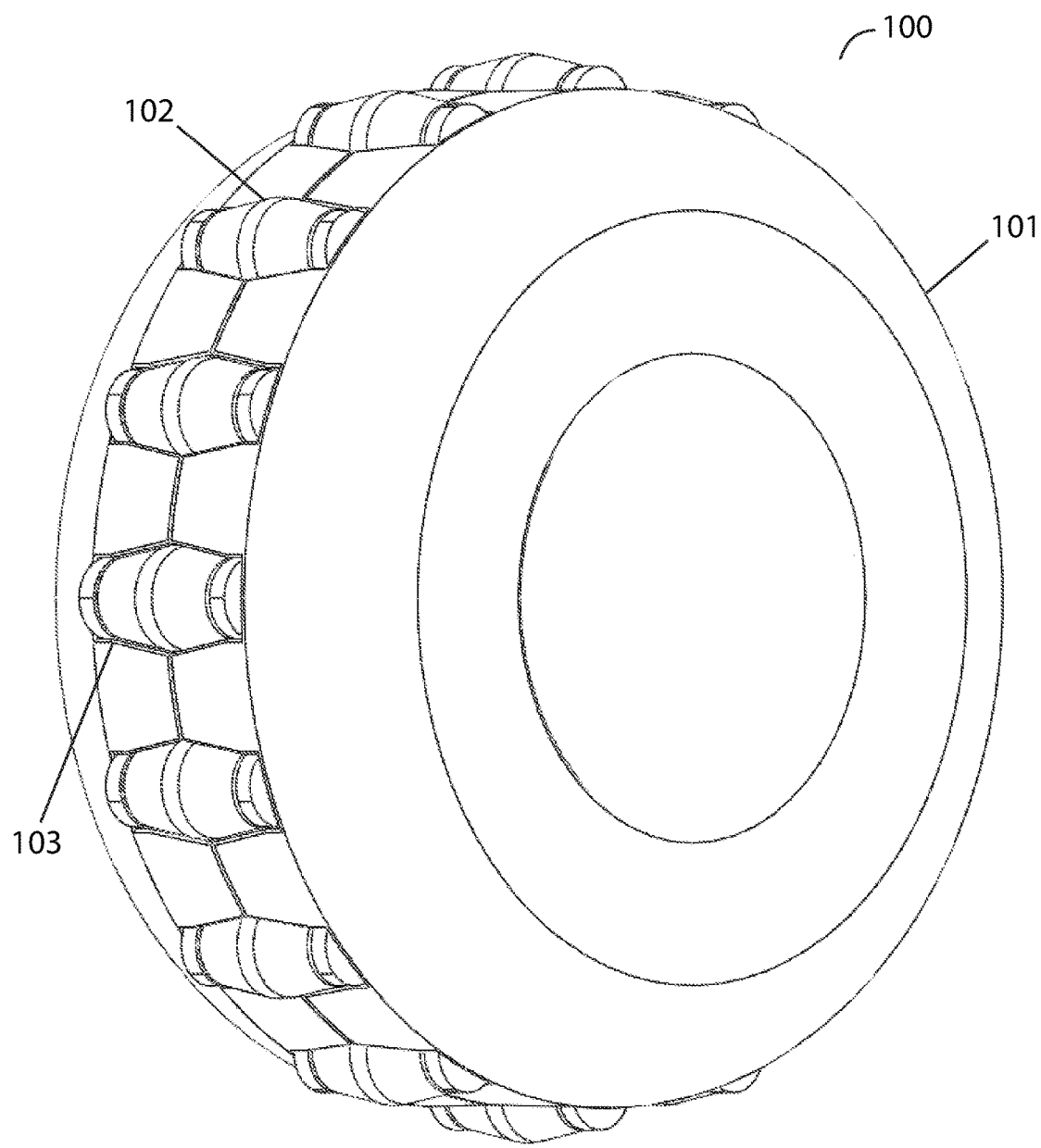
FIG. 1 illustrates a perspective view of an expandable wheel in a contracted position embodying features of the present invention.

Referring to FIG. 1, a perspective view of expandable wheel 100 is illustrated in a contracted position. As can be seen, each roller 102 protrudes slightly through an aperture 103. Again, the main housing 101 of the wheel remains fixed when the rollers are pushed outward through the apertures to create a larger wheel circumference.

Figure 2:
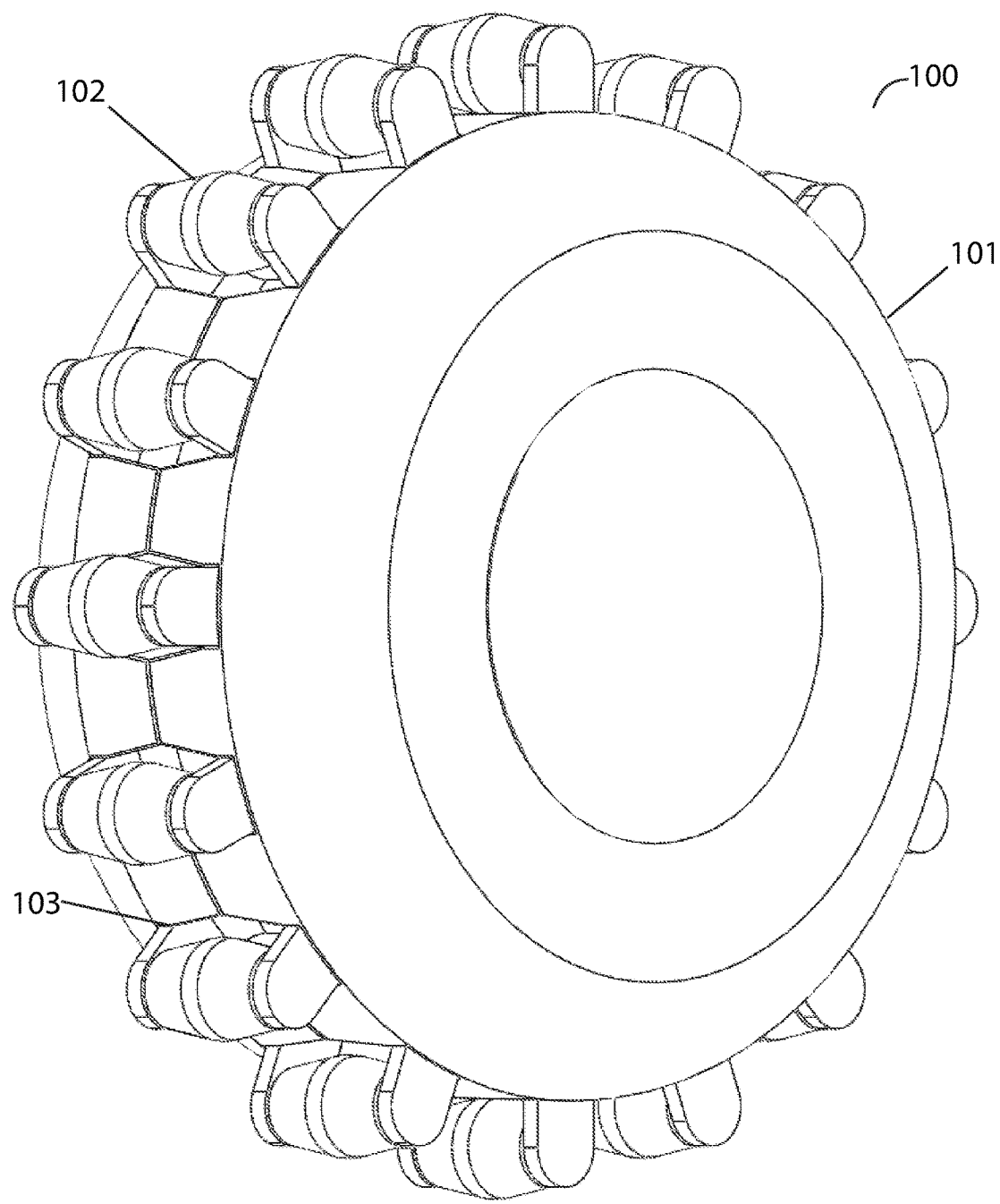
FIG. 2 illustrates a perspective view of an expandable wheel in an expanded position embodying features of the present invention.

Referring to FIG. 2, expandable wheel 100 is illustrated in an expanded position. As can be seen, the main housing 101 of the wheel has remained in a fixed position in relation to the rollers 102, which have been pushed radially outward from the center of the wheel through the apertures 103 via spokes within the wheel (not shown). Each roller is mounted at the end of a link member so as to be rotatable around an axial of the roller.

Figure 3:
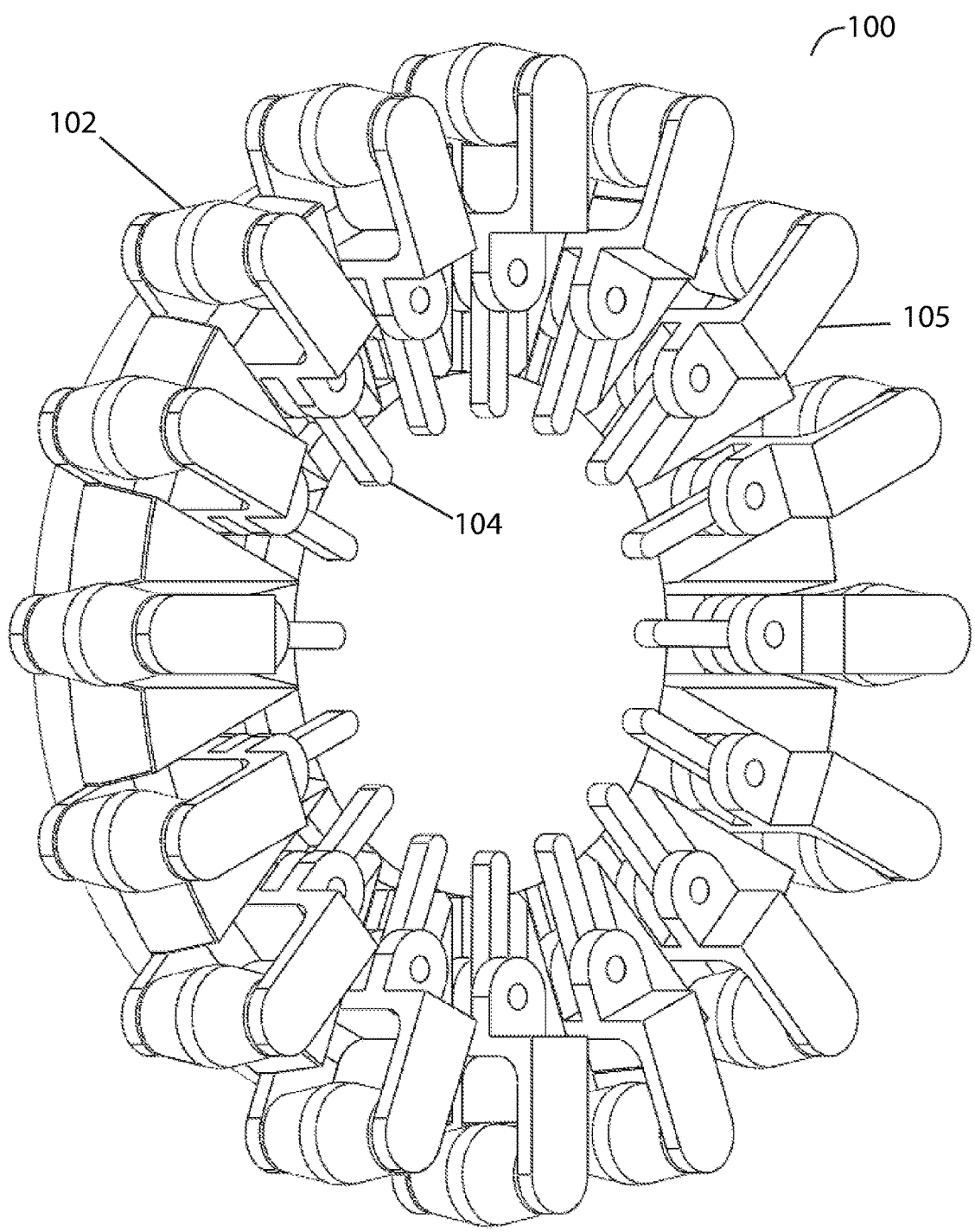
FIG. 3 illustrates a cutaway of an expandable wheel embodying features of the present invention.

Referring to FIG. 3, a cutaway of the wheel 100 is illustrated to show the interior parts. Each roller 102 is mounted on the end of a pivoting linkage 105 connected to a spoke 104. The inner ends of the spokes are connected to an inner shaft (not shown) that is rotated within the wheel to push the spokes in or out. In the preferred embodiment, the rollers are rotatable around an axial.

Figure 4A:
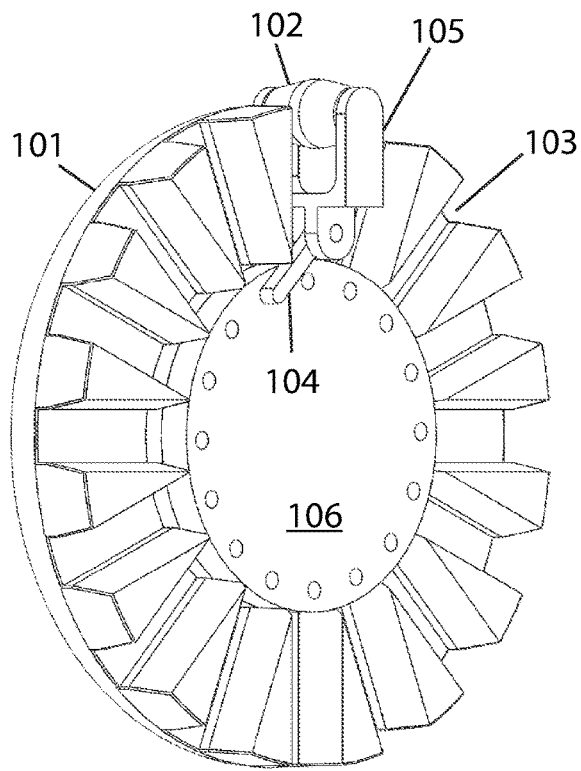
FIG. 4A illustrates a cutaway of an expandable wheel in a contracted position embodying features of the present invention.
Figure 4B:
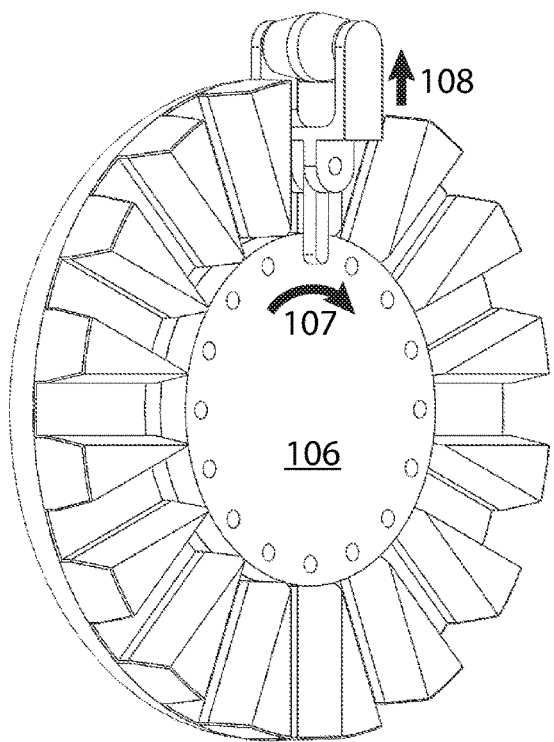
FIG. 4B illustrates a cutaway of an expandable wheel in an expanded position embodying features of the present invention.

Referring briefly to both FIGS. 4A and 4B, cutaway views of the wheel are illustrated to more clearly portray the internal parts. In both drawings, a singular spoke, linkage, and roller is illustrated in order to portray the parts more clearly, however, in practice, each of the apertures 103 would contain a spoke, linkage and roller. Referring to FIG. 4A, the spoke 104, linkage 105 and roller 102 are in a contracted position. The spoke 104 is mounted pivotally by a first end to an inner shaft 106, which is co-centered and coupled within the main housing 101. The inner shaft is coupled with the main housing in such a way as to allow rotation of the inner shaft with relation to the main housing. Such rotation causes the spokes together with the pivoting linkages to work as a crank mechanism and translate the relative rotation of the two parts to a linear movement of the roller outward from the center of the wheel, the aperture working as a guide. As shown in FIG. 4B, this movement results in each spoke, linkage, and roller group to be extended in a radially outward direction 108. When the inner shaft 106 is rotated in direction 107 and goes from the position shown in FIG. 4A to the position shown in FIG. 4B wherein each spoke is parallel with the corresponding aperture, the spokes and linkages are pushed outward, causing the rollers to protrude further through the apertures.

When the inner shaft and main housing are rotated in the same direction and at the same rate, the wheel simply turns as a normal wheel and the rollers, spokes and linkages are not pushed outward or inward. It is when the inner shaft is rotated in an opposite direction of the main housing that the rollers, spokes and linkages are pushed outward or inward.

Figure 5A:
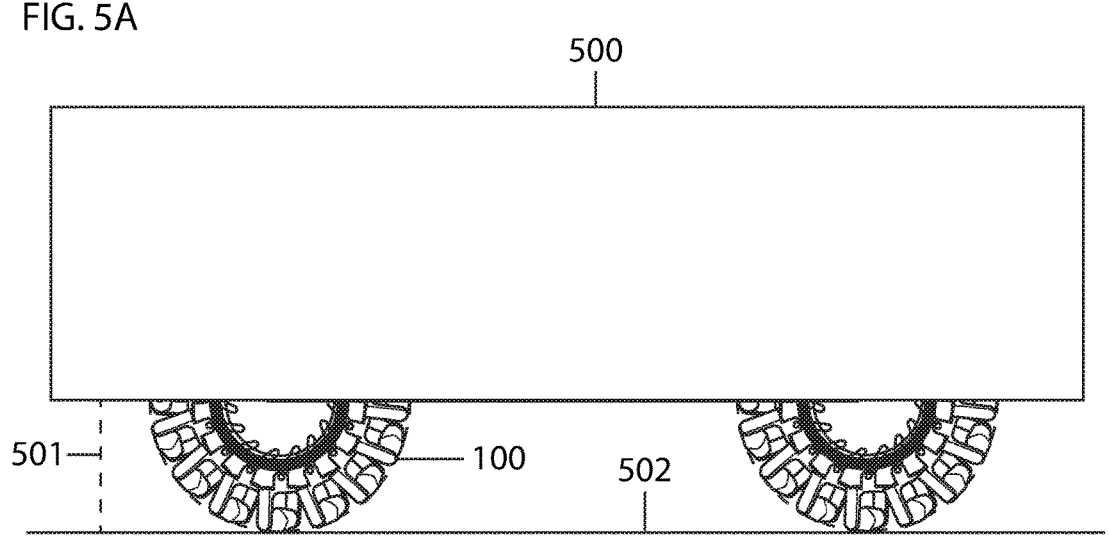
FIG. 5A illustrates a side elevation view of a robotic floor cleaning device with expandable wheels in a contracted position embodying features of the present invention.

Referring to FIG. 5A, a side elevation view of a robotic floor cleaning device 500 with expanding wheels 100 in their contracted position is illustrated. In this example, the wheels 100 are in a contracted position and thus have their smallest possible circumference. This maintains a smallest possible distance 501 to the work surface 502, which may aide the device in driving under furniture and picking up debris.

Figure 5B:
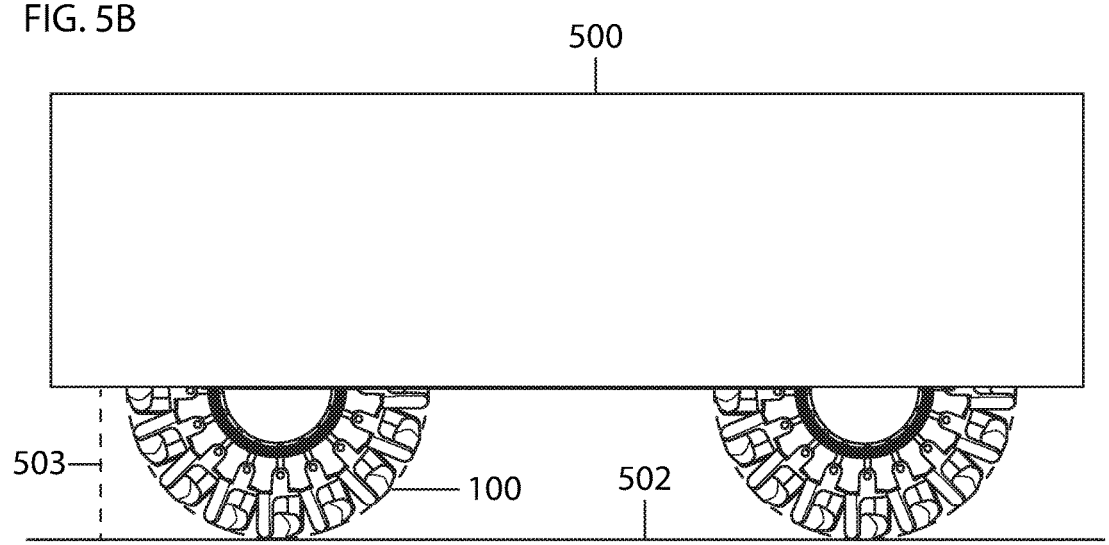
FIG. 5B illustrates a side elevation view of a robotic floor cleaning device with expandable wheels in an expanded position embodying features of the present invention.

Referring to FIG. 5B, a side elevation view of the robotic floor cleaning device 500 with expanding wheels 100 in an expanded position is illustrated. In this example, the wheels 100 are in an expanded position and thus have their greatest possible circumference. This maintains a greatest possible distance 503 to the work surface 502, which may aide the device in driving over obstacles or various work surfaces.

In some embodiments, the invention further comprises sensors to detect conditions when the wheels should be expanded. For example, a sensor monitoring tension on wheels may cause the wheels to expand when more than a predetermined amount of tension is detected. Similarly, a sensor monitoring rate of rotation of a wheel may cause the wheels to expand when it is determined that rotation is not concurrent with motor power. It will be obvious to one skilled in the art that the disclosed invention can benefit from any kind of sensing mechanism to detect tension etc.

We claim:

1. A mobile robotic floor-cleaning device comprising:
   a chassis including a set of wheels, each wheel comprising:
      a main housing with a series of apertures disposed radially thereabout;
      an inner shaft disposed within the main housing rotatably coupled thereto;
      a set of spokes distributed radially around the inner shaft and attached thereto at a first end, each spoke positioned within one of the series of apertures in the main housing;
      a set of linkages distributed radially around the inner shaft and attached to a second end of the spokes, the linkages positioned within the apertures; and,
      a set of rollers distributed radially around the inner shaft and mounted on the linkages;
   a motor to drive the wheels;
   a battery to provide power to the robotic device; and,
   a controller in communication with the motor and wheels, the controller including a processor operable to control the motor and wheels to steer movement of the robotic device,
   wherein the spokes, linkages and rollers can be moved from a first, contracted position in which the spokes are positioned at a first angle with respect to a radius line connecting the center of the inner shaft and the first end of the respective spoke and the linkages and rollers are pulled by the spokes towards the inner shaft, to a second, expanded position, in which the spokes are positioned at a second angle, greater than the first angle, with respect to the radius line connecting the center of the inner shaft and the first end of the respective spoke and the linkages and rollers are pushed outward from the inner shaft by clockwise or counter clockwise rotation of the inner shaft relative to the main housing.

2. The mobile robotic floor-cleaning device of claim 1 wherein a sleeve is provided around each aperture to limit the wear of the linkage and provide better support for guiding the linkage.

3. The mobile robotic floor-cleaning device of claim 1 wherein the spokes, linkages, and rollers may be maintained at any position between the first, contracted position and the second, expanded position.

4. The mobile robotic floor-cleaning device of claim 1 wherein the each wheel has between 10 and 20 aperture, spoke, linkage, and roller sets.

5. A mobile robotic floor-cleaning device comprising:
   a chassis including a set of four wheels;
   a motor to drive the wheels;
   a central processing unit to control a movement path of the mobile robotic floor-cleaning device;
   a floor-cleaning tool; and
   a battery to power the motor;
   wherein in the wheels are each comprised of:
   a main housing with a series of apertures disposed radially thereabout;
   an inner shaft disposed within the main housing rotatably coupled thereto;
   a set of spokes distributed radially around the inner shaft and attached thereto at a first end, each spoke positioned within one of the series of apertures in the main housing;
   a set of linkages distributed radially around the inner shaft and attached to a second end of the spokes, the linkages positioned within the apertures; and,
   a set of rollers distributed radially around the inner shaft and mounted on the linkages;
   whereby the spokes, linkages and rollers can be moved from a first, contracted position in which the spokes are positioned at a first angle with respect to a radius line connecting the center of the inner shaft and the first end of the respective spoke and the linkages and rollers are pulled by the spokes towards the inner shaft, to a second, expanded position, in which the spokes are positioned at a second angle, greater than the first angle, with respect to the radius line connecting the center of the inner shaft and the first end of the respective spoke and the linkages and rollers are pushed outward from the inner shaft by clockwise or counter clockwise rotation of the inner shaft relative to the main housing.

6. The mobile robotic floor-cleaning device of claim 5 wherein a sleeve is provided around each aperture to limit the wear of the linkage and provide better support for guiding the linkage.

7. The mobile robotic floor-cleaning device of claim 5 wherein the spokes, linkages, and rollers may be maintained at any position between the first, contracted position and the second, expanded position.

8. The mobile robotic floor-cleaning device of claim 5 wherein the each wheel has between 10 and 20 aperture, spoke, linkage, and roller sets.

9. A mobile robotic floor-cleaning device comprising:
   a chassis including a set of four wheels, each wheel including:
      a main housing with a series of apertures disposed radially thereabout;
      an inner shaft disposed within the main housing rotatably coupled thereto;

a set of spokes distributed radially around the inner shaft and attached thereto at a first end, each spoke positioned within one of the series of apertures in the main housing;

a set of linkages distributed radially around the inner shaft and attached to a second end of the spokes, the linkages positioned within the apertures; and, a set of rollers distributed radially around the inner shaft and mounted on the linkages;

a motor to drive the wheels;

a battery to provide power to the robotic device; and, a controller in communication with the motor and wheels, the controller including a processor operable to control the motor and wheels to steer movement of the robotic device;

whereby the spokes, linkages and rollers can be moved from a first, contracted position in which the spokes are positioned at a first angle with respect to a radius line connecting the center of the inner shaft and the first end of the respective spoke and the linkages and rollers are pulled by the spokes towards the inner shaft, to a second, expanded position, in which the spokes are positioned at a second angle, greater than the first angle, with respect to the radius line connecting the center of the inner shaft and the first end of the respective spoke and the linkages and rollers are pushed outward from the inner shaft by clockwise or counter clockwise rotation of the inner shaft relative to the main housing.

10. The mobile robotic floor-cleaning device of claim 9 wherein a sleeve is provided around each aperture to limit the wear of the linkage and provide better support for guiding the linkage.

11. The mobile robotic floor-cleaning device of claim 9 wherein the spokes, linkages, and rollers may be maintained at any position between the first, contracted position and the second, expanded position.

12. The mobile robotic floor-cleaning device of claim 9 wherein each wheel has between 10 and 20 aperture, spoke, linkage, and roller sets.

\* \* \* \* \*